United States Patent [19]

Busby

[11] Patent Number: 5,441,292
[45] Date of Patent: Aug. 15, 1995

[54] BICYCLE REAR SUSPENSION SYSTEM
[75] Inventor: James S. Busby, Laguna Beach, Calif.
[73] Assignee: GT Bicycles, Inc., Santa Ana, Calif.
[21] Appl. No.: 227,009
[22] Filed: Apr. 13, 1994

Related U.S. Application Data

[63] Continuation-in-part of Ser. No. 121,783, Sep. 15, 1993, Pat. No. 5,409,249.

[51] Int. Cl.6 .............................................. B62K 25/28
[52] U.S. Cl. ................................................... 280/284
[58] Field of Search ............... 280/275, 283, 284, 285, 280/286, 288

[56] References Cited

U.S. PATENT DOCUMENTS

| | | | |
|---|---|---|---|
| 439,095 | 10/1890 | Becker | 280/261 |
| 578,615 | 3/1897 | Travis | 280/284 |
| 606,323 | 6/1898 | Wronski | 280/276 |
| 657,667 | 9/1900 | Mills | 280/284 |
| 944,795 | 12/1909 | Leet et al. | 280/284 |
| 1,047,430 | 12/1912 | Michaelson | 280/284 |
| 1,257,761 | 2/1918 | Strand | 280/284 |
| 1,298,958 | 4/1919 | Johnston | 280/284 |
| 1,412,012 | 4/1922 | Bruno | 280/284 |
| 1,594,079 | 7/1926 | Tanner | 33/465 |
| 3,917,313 | 11/1975 | Smith et al. | 280/284 |
| 4,322,088 | 3/1982 | Miyakoshi et al. | 280/284 |
| 4,506,755 | 3/1985 | Tsuchida et al. | 180/227 |
| 4,529,056 | 7/1985 | Kreuz | 180/227 |
| 4,673,053 | 6/1987 | Tanaka et al. | 180/227 |
| 4,789,174 | 12/1988 | Lawwill | 280/284 |
| 4,951,791 | 8/1990 | Creixell | 180/219 |
| 4,997,197 | 3/1991 | Shultz | 280/275 |
| 5,098,114 | 3/1992 | Jones | 280/284 |
| 5,121,937 | 6/1992 | Lawwill | 280/284 |
| 5,205,572 | 4/1993 | Buell et al. | 280/284 |
| 5,244,224 | 9/1993 | Busby | 280/284 |
| 5,259,637 | 11/1993 | Busby | 280/284 |
| 5,306,036 | 4/1994 | Busby | 280/284 |

FOREIGN PATENT DOCUMENTS

| | | | |
|---|---|---|---|
| 3033294 | 4/1981 | Germany | 280/285 |
| 428442 | 12/1947 | Italy | 280/285 |
| 5105168 | 4/1993 | Japan | 280/284 |
| 15332 | 11/1915 | United Kingdom | 280/284 |
| 220760 | 8/1924 | United Kingdom . | |
| 9215477 | 8/1992 | WIPO | 280/285 |
| 9313974 | 7/1993 | WIPO | 280/284 |

OTHER PUBLICATIONS

1992 Cannondale Spec—Suspension Mountain Bicycles—Article—10 pgs.
TREK 9000 Series Spec="This Beauty Is A Beast-"—Article—8 pgs.
Fisher RS-1—Article—4 pgs.—Mountain Bike Action/Mar. '92.
Suspension Mania Strikes Cycling—Mountain Bike Action/Feb. '92 3 pgs.
Boulder Intrepid AL—2 pgs.—Mountain Bike Action/Mar. '92.
Team Shockblok—6 pgs.—Mountain Bike Action/Jul. '92.
Mountain Bike Action, Oct. 1992, pp. 10, 25-26, 28-29, 31, 36-37, 39-41, 44-45, 47, 58, 70, 73, 76, 79, 123, and 130.
Bicycling, Nov. 1992, pp. 26-27, 58, 63-64, and 105.

(List continued on next page.)

Primary Examiner—Brian L. Johnson
Assistant Examiner—Kevin Hurley
Attorney, Agent, or Firm—Stetina Brunda & Buyan

[57] ABSTRACT

A bicycle rear suspension linkage system comprising a bicycle frame having an upper link pivotally connected thereto. Also pivotally connected to the bicycle frame are the front ends of a pair of chain stay members, while pivotally connected to the upper link are the upper ends of a pair of seat stay members. The lower ends of the seat stay members are also pivotally connected to the back ends of the chain stay members. The rear suspension linkage system further comprises a shock absorber having a first end connected to the seat stay members and a second end connected to the upper link.

15 Claims, 4 Drawing Sheets

OTHER PUBLICATIONS

Mountain Biking, Nov. 1992, vol. 6, No. 11, pp. 6–9, 25, 48–49, 65, 71, 73, 108–109, 115, 124, 129, 140, 143, 163, and 169.

Mountain Biking, Dec. '92, pp. 1-2, 5, 18, 44–49, 77, 127, and 160.

Mountain Biking, Jan. '93, vol. 7, No. 1, pp. 32–33, 40, 45, 71, 75, 82–83, 115 and 117.

Welcome to the Next Generation . . . —9 pp.—Mountain Bike—Jun. '92.

Schwinn S.A.S.S.—7 pgs.—Mountain Bike Action—May '92.

Offroad Pro-Flex 550—3 pgs.—Offroad.

If the Best Motorcycle . . . "Litespeed Suspension", Mountain Bike—Jul. '9, 8 pgs.

Slingshot—*Mountain & City Biking,* 6 pgs.

guide to Suspension and High Performance, vol. 3, 1992, pp. 9, 13–15, 17, 30–31, 36–37, 42–45, 47, 53, 60, 69, 71, 76, 85–87, 92, 96, 98, 100, 108–112, 117 and 119.

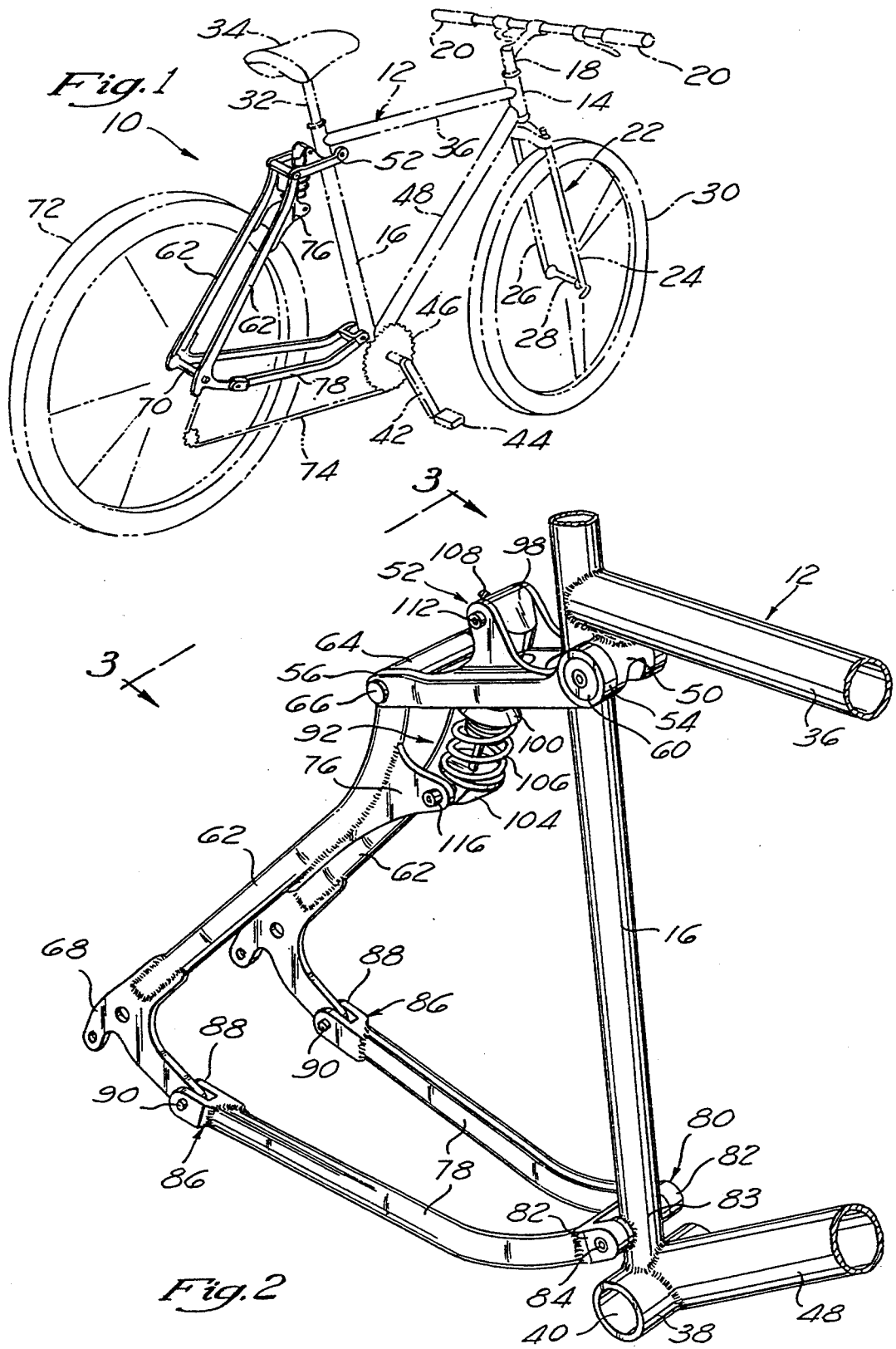

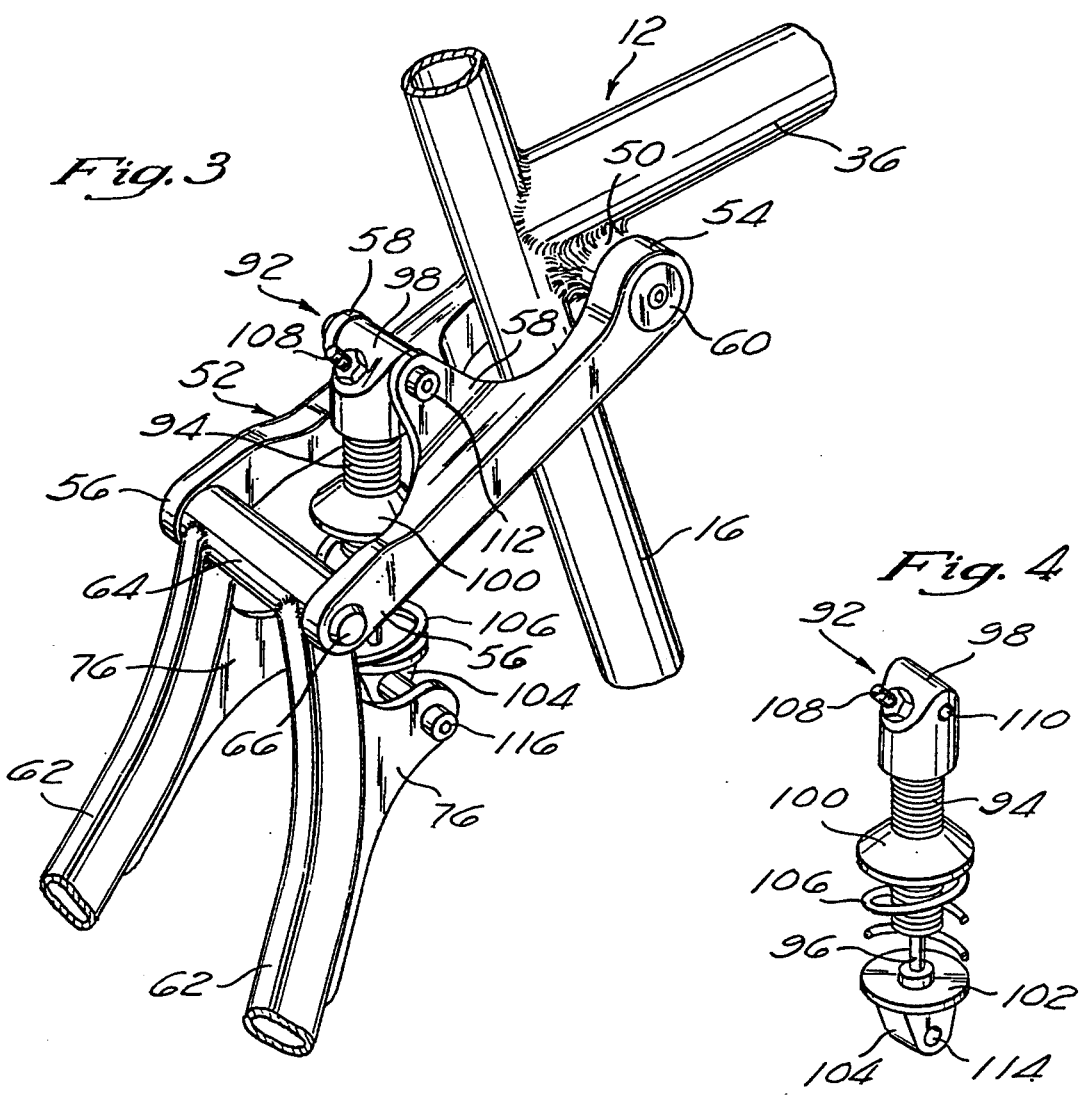

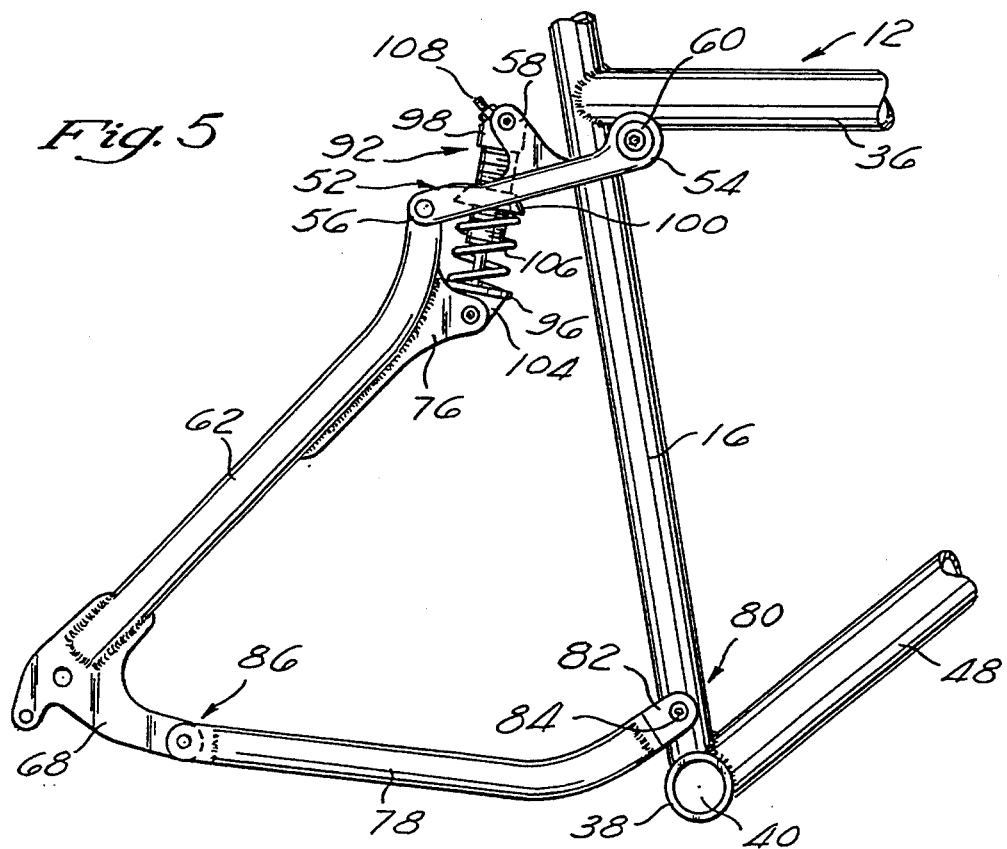
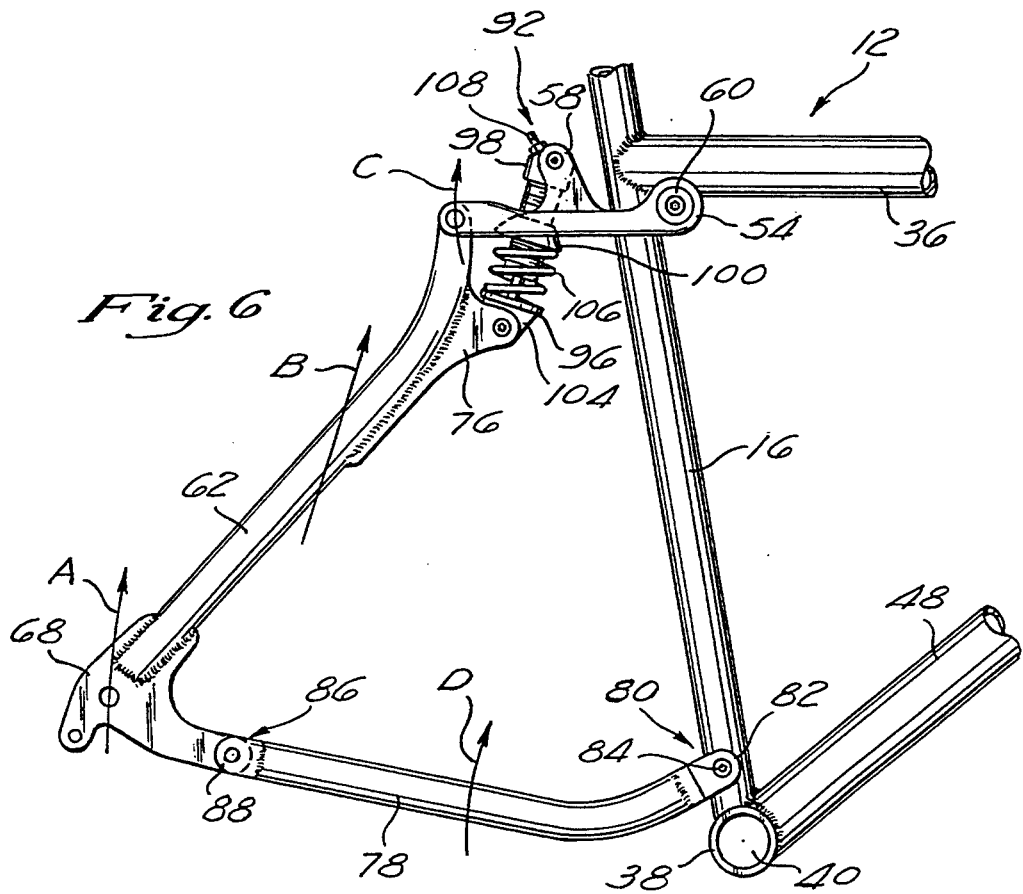

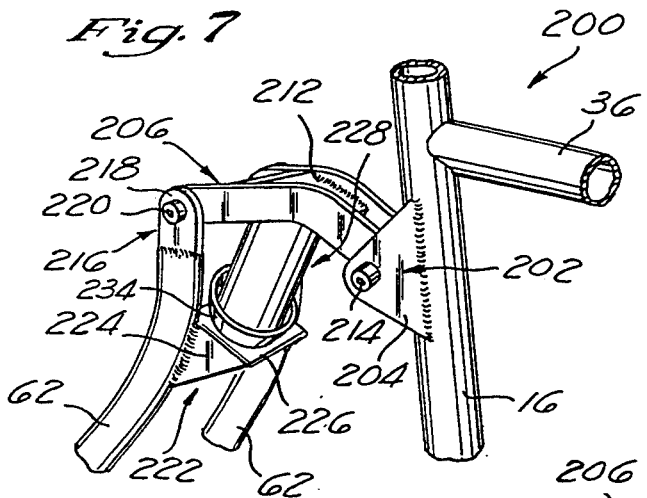
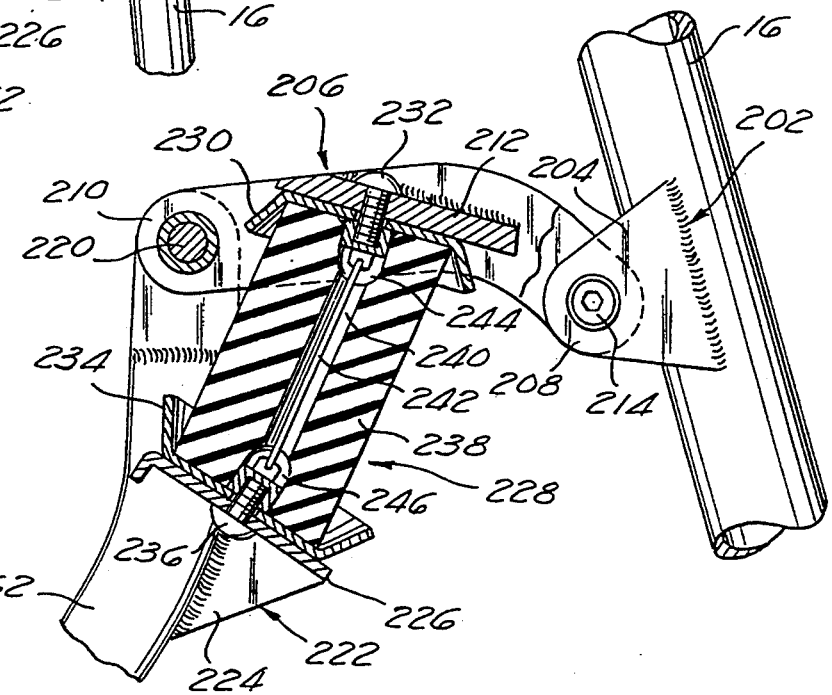
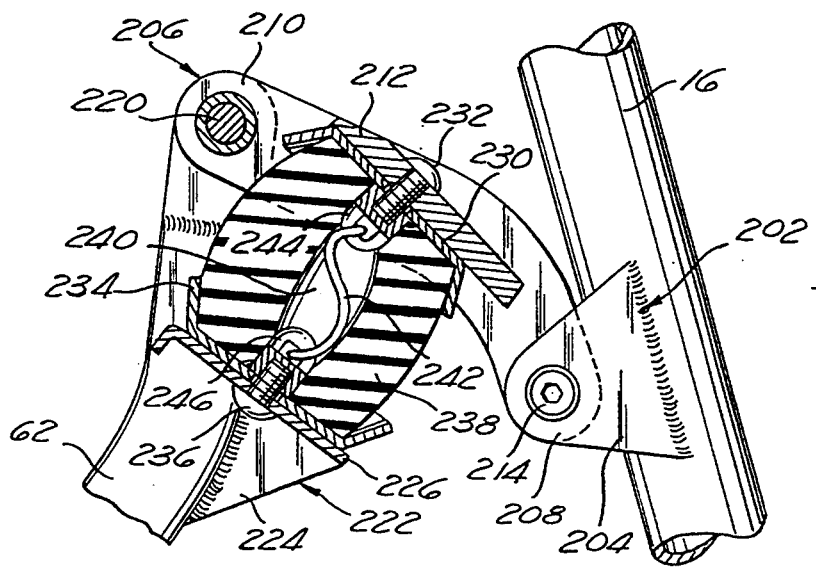

BICYCLE REAR SUSPENSION SYSTEM

The present application is a continuation-in-part of application Ser. No. 08/121,783 filed Sep. 15, 1993, U.S. Pat. No. 5,409,249 the disclosure of which is expressly incorporated herein by reference.

FIELD OF THE INVENTION

The present invention relates generally to bicycles, and more particularly to a rear suspension system for a bicycle frame which possesses shock absorbing characteristics and is adapted to enhance the performance of the bicycle.

BACKGROUND OF THE INVENTION

The primary structural component of a bicycle is the bicycle frame. Typically, the bicycle frame comprises an elongate top tube which is rigidly secured to and extends between a head tube of the bicycle and a seat tube of the bicycle. The head tube typically provides a structural base for the stem of the bicycle to which the handle bars are attached. The seat tube provides a base for a seat post which is generally telescopically received therewithin and to which is secured the saddle or seat of the bicycle. In typical bicycle frame construction, the seat tube includes a generally cylindrical axle-receiving bracket attached to the lower end thereof which is adapted to receive the bottom bracket axle. The bottom bracket axle typically extends between and interconnects the cranks to which are attached the pedals. Rigidly secured to and extending between the head tube and the cylindrical axle-receiving bracket is an elongate down tube.

In addition to the aforementioned structural components, rigidly secured to and extending rearwardly from the axle-receiving bracket are first and second chain stay members. Additionally, rigidly secured to and extending downwardly from the upper end of the seat tube are first and second seat stay members having lower ends which are rigidly secured to the back ends of the first and second chain stay members. Typically, the lower ends of the seat stay members and back ends of the chain stay members are interconnected in a manner adapted to receive the rear tire axle of the rear wheel. The head tube, seat tube, top tube and down tube are typically secured to each other and to the axle-receiving bracket in a manner defining a main front triangle portion of the bicycle frame. The seat stay and chain stay members, when connected to the seat tube, axle-receiving bracket and each other, typically define a back triangle portion of the bicycle frame.

The foregoing description generally represents the construction of conventional prior art bicycle frames. Typically, when such prior art frames are constructed, the aforementioned structural components are rigidly secured to one another through the use of welding or brazing techniques. Though this method of constructing the bicycle frame provides the resulting frame with structural integrity, the bicycle frame does not possess a suspension having shock absorbing characteristics. As will be recognized, the ride, comfort and performance of the bicycle would be greatly enhanced if the bicycle frame were adapted to at least partially accommodate the shocks routinely encountered while riding the bicycle.

Though recent prior art bicycle frames include front and/or rear shock absorbing assemblies, such bicycle frames possess certain deficiencies which detract from their overall utility. In most prior art rear shock absorbing assemblies, the rear axle pivots about a single elevated pivot point when subjected to a shock force which generally results in the rear wheel axle moving upwardly in an arc rather than moving vertically upward in a substantially linear fashion.

Typically, if the rear wheel axle is caused to move arcuately due to the absorption of a bump or shock force by the rear tire, the bicycle frame will normally rise and fall a few times due to suspension oscillations after the obstacle or obstruction has been cleared by the rear tire. This bouncing action which occurs at a frequency attendant to the structure of the rear shock absorbing assembly will typically require the rear tire to speed up and slow down as it keeps up with the bicycle's constant velocity, since the wheel base of the bicycle is changing as the rear wheel axle moves arcuately back to its original position. This constant changing of the rear tire's angular velocity requires energy due to the effects on the rear tire's angular momentum, thus diminishing riding efficiency.

Further, the rear shock absorbing assemblies are typically mounted directly to the main front triangle portion of the bicycle frame, and are configured in a manner which results in the amount of rear wheel travel being greater or less than the amount of shock absorber travel when a shock force is applied to the rear wheel. In certain prior art rear shock-absorbing assemblies, less and less additional force is required to compress the shock absorber of the assembly for each equal increment in rear wheel movement due to the mechanical advantage of the shock absorber over the rear wheel decreasing throughout the rear wheel travel. This type of suspension wherein the wheel rate is regressive is generally undesirable due to the tendency of the shock absorber to "bottom-out". Other prior art rear shock absorbing assemblies are configured in a manner so as to achieve a progressive wheel rate wherein more and more additional force is needed to compress the shock absorber for each equal increment in rear wheel movement. Though a progressive wheel rate is more desirable than a regressive wheel rate, optimal performance of the bicycle is achieved with a flat wheel rate wherein the ratio of movement, i.e. the motion ratio, between the shock absorber and the rear wheel is constant throughout the range of vertical travel of the rear wheel.

In addition to the foregoing, the mounting of the shock absorber assembly to the main front triangle portion of the bicycle frame sometimes results in the force of the shock being transmitted directly to the main front triangle portion of the bicycle frame as bending moments or torque which adversely affects the overall smoothness of the bicycle ride. As such, a much more smooth and even ride would be obtained if the shock absorber assembly was not mounted directly to the main front triangle portion of the bicycle frame, and was configured to provide a flat rate of rear wheel travel. The present invention specifically overcomes these and other deficiencies associated with the prior art shock absorbing bicycle frames.

SUMMARY OF THE INVENTION

In accordance with a preferred embodiment of the present invention, there is provided a shock-absorbing bicycle rear suspension linkage system which is adapted to provide the bicycle frame and hence the bicycle with enhanced riding comfort and performance. The bicycle rear suspension linkage system generally comprises a bicycle frame having an upper link pivotally connected thereto. Pivotally connected to the upper link are the upper ends of a pair of seat stay members, while pivotally connected to the bicycle frame are the front ends of a pair of chain stay members. The back ends of the chain stay members are themselves pivotally connected to the lower ends of the seat stay members.

The linkage system further comprises a shock absorber having a body portion and a reciprocally movable piston rod extending axially from the body portion which facilitates viscous damping control when working in a hydraulic fluid. The piston rod defines a distal end which is pivotally connected to the seat stay members, with the body portion being pivotally connected to the upper link. The shock absorber further comprises a spring member which extends between the body portion and the seat stay members, with the piston rod extending axially through the spring member.

In the preferred embodiment, the bicycle frame comprises a head tube disposed at the front of the bicycle frame, a seat tube disposed at the rear of the bicycle frame, and an elongate top tube having opposed ends rigidly attached to the head tube add the seat tube. A pair of rear wheel axle receiving members are rigidly attached to the lower ends of the seat stay members, and pivotally connected to the back ends of the chain stay members. Rigidly attached to the seat tube and the top tube is a link mount to which the upper link is pivotally connected. Additionally, rigidly attached to the front ends of the chain stay members is a chain stay end housing which is pivotally connected to the seat tube, while rigidly attached to the upper ends of the seat stay members is a seat stay end housing which is pivotally connected to the upper link.

In accordance with a second embodiment of the present invention, there is provided a bicycle rear suspension linkage system comprising a bicycle frame having an upper link pivotally connected thereto. Pivotally connected to the upper link are the upper ends of a pair of seat stay members, while pivotally connected to the bicycle frame are the front ends of a pair of chain stay members. The back ends of the chain stay members are themselves pivotally connected to the lower ends of the seat stay members.

The linkage system constructed in accordance with the second embodiment further comprises a shock absorber having a first end connected to the seat stay members and a second end connected to the upper link. The shock absorber preferably comprises an upper retaining plate which is rigidly attached to the upper link and a lower retaining plate which is rigidly attached to the seat stay members. Firmly seated between the upper and lower retaining plates is a dampening member which is preferably fabricated from an elastomeric material. The dampening member preferably defines a central aperture extending longitudinally therethrough, with the shock absorber further comprising a limiting cable extending through the central aperture of the dampening member and defining opposed ends attached to the upper and lower retaining plates. The dampening member is preferably compressed between the upper and lower retaining plates to maintain it in position and provide a preload thereto, though the same may alternatively be mechanically fastened to the upper and lower retaining plates.

BRIEF DESCRIPTION OF THE DRAWINGS

These as well as other features of the present invention will become more apparent upon reference to the drawings wherein:

FIG. 1 is a perspective view of a bicycle incorporating the rear suspension linkage system constructed in accordance with the present invention;

FIG. 2 is a partial perspective view of a portion of the rear suspension linkage system of the present invention;

FIG. 3 is an enlarged perspective view taken along line 3—3 of FIGS. 2;

FIG. 4 is a perspective view of the shock absorber shown in FIGS. 2 and 3;

FIG. 5 is a side-elevational view of the rear suspension linkage system in the unactuated state;

FIG. 6 is a side elevational view of the rear suspension linkage system in the actuated state;

FIG. 7 is a perspective view of the shock absorber of a rear suspension linkage system constructed in accordance with a second embodiment of the present invention;

FIG. 8 is a cross-sectional view of the shock absorber shown in FIG. 7 in its normal, uncompressed state; and FIG. 9 is a cross-sectional view of the shock absorber shown in FIG. 7 in its compressed state.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a bicycle 10 incorporating a bicycle frame 12 constructed to incorporate the bicycle rear suspension linkage system constructed in accordance with a first embodiment of the present invention. The bicycle frame 12 generally comprises a head tube 14 disposed at the front end of the bicycle 10 and a seat tube 16 disposed toward the rear end of the bicycle 10. Connected to the top end of the head tube 14 is a stem 18 to which is attached the handle bars 20. Connected to the bottom end of the stem 18 is a conventional front shock absorber assembly 22 defining a first fork 24 and a second fork 26 between which is mounted the axle 28 of the front wheel 30. Importantly, the front shock absorber assembly 22 is adapted to provide the compressive first fork 24 and compressive second fork 26 with shock absorbing capability. Telescopically received into the top end of the seat tube 16 is a seat post 32 having a saddle or seat 34 connected thereto.

Rigidly attached to and extending between the head tube 14 and seat tube 16 is an elongate top tube 36. Additionally, rigidly attached to the bottom end of the seat tube 16 is an axle receiving bracket 38 having an axle-receiving bore 40 extending axially therethrough. In the preferred embodiment, the axle receiving bracket 38 has a generally cylindrical configuration and is attached to the lower end of the seat tube 16 via a brazed or welded connection. The bore 40 of the axle receiving bracket 38 is sized and configured to receive a bottom bracket axle of the bicycle 10. Attached to the opposed ends of the bottom bracket axle are a pair of cranks 42 to which are attached pedals 44. Additionally, attached to one end of the bottom bracket axle between the axle receiving bracket 38 and a crank 42 is a chainwheel 46 which is adapted to rotate concurrently with the bottom bracket axle. Rigidly attached to and extending between the head tube 14 and the axle receiving bracket 38 is an elongate down tube 48. In the preferred embodiment, the head tube 14, top tube 36, axle receiving bracket 38, and down tube 48 each have generally cylindrical configurations and are secured to one another via welded or brazed connections.

Referring now to FIGS. 2 and 3, rigidly attached to the seat tube 16 and top tube 36 is a cylindrically configured link mount 50 defining a bore extending laterally therethrough. In the preferred embodiment, the link mount 50 is attached to the seat tube 16 and top tube 36 via a welding or brazing process. Though the link mount 50 is preferably attached to both the seat tube 16 and top tube 36 to provide the resultant bicycle frame 12 with greater structural integrity, it will be recognized that the link mount 50 may be attached solely to either the seat tube 16 or top tube 36.

Pivotally connected to the link mount 50 is an upper link 52. In the preferred embodiment, the upper link 52 defines a front pair of mounting ears 54, a back pair of mounting ears 56, and a central pair of mounting ears 58. Extending laterally through each pair of mounting ears 54, 56, 58 is a pair of coaxially aligned apertures. The upper link 52 is pivotally connected to the link mount 50 by initially orienting the front pair of mounting ears 54 adjacent the opposed ends of the link mount 50, i.e. inserting the link mount 50 into the space defined between the front pair of mounting ears 54. In this respect, the distance separating the mounting ears 54 of the front pair is adapted to slidably accommodate the link mount 50. When the link mount 50 is properly positioned between the front pair of mounting ears 54, the pair of apertures disposed within the mounting ears 54 will be coaxially aligned with the bore of the link mount 50. Thereafter, a fastener 60 is inserted into the coaxially aligned apertures and bore thus pivotally connecting the upper link 52 to the link mount 50.

The bicycle frame 12 of the present invention further comprises a pair of identically configured seat stay members 62 which have upper ends rigidly attached to an elongate seat stay end housing 64 via a welding or brazing process. The seat stay end housing 64 defines a bore extending laterally therethrough, and is pivotally connected to the upper link 52. In this respect, the seat stay end housing 64 is inserted into the space defined between the back pair of mounting ears 56 which are spaced from each other a distance sufficient to allow the seat stay end housing 64 to be slidably received therebetween. The end housing 64 is oriented between the back pair of mounting ears 56 such that the apertures of the mounting ears 56 are coaxially aligned with the bore of the end housing 64. Thereafter, a fastener 66 is extended through the coaxially aligned apertures and bore, thus pivotally securing the end housing 64, and hence the seat stay members 62, to the upper link 52. Rigidly attached to the lower ends of the seat stay members 62 is a pair of rear wheel axle receiving members 68, one of which is adapted to accommodate a rear derailleur. The rear wheel axle receiving members 68 are adapted to support the rear wheel axle 70 of the rear wheel 72 therebetween. Attached to one end of the rear wheel axle 70 is a rear sprocket which is cooperatively engaged to the chainwheel 46 via a chain 74.

As best seen in FIGS. 2 and 3, the upper portions of the seat stay members 62 are arcuately contoured, and bowed inwardly toward the seat tube 16 when the end housing 64 is pivotally connected to the upper link 52. Rigidly attached to the arcuately contoured portions of the seat stay members 62 in opposed relation is a pair of identically configured shock mounts 76 which are also directed inwardly toward the seat tube 16. In the preferred embodiment, the attachment of the shock mounts 76 and rear wheel axle receiving members 68 to the seat stay members 62 is facilitated by a welding or brazing process.

In addition to the seat stay members 62, the bicycle frame 12 further includes a pair of chain stay members 78 which have front ends rigidly attached to a chain stay end housing 80 via a welding or brazing process. The chain stay end housing 80 defines a pair of mounting ears 82 which include a pair of coaxially aligned apertures extending laterally therethrough. Disposed within the lower portion of the seat tube 16 is a chain stay pivot mount 83 which is extended through a complimentary aperture extending laterally through the lower portion of the seat tube 16 and rigidly secured therewithin via a welding or brazing process. The mounting ears 82 of the chain stay end housing 80 are separated from each other a distance sufficient to allow the opposed ends of the chain stay pivot mount 83 to be inserted into the space defined between the mounting ears 82. The end housing 80, and more particularly the mounting ears 82, are preferably extended about the chain stay pivot mount 83 such that the apertures extending through the mounting ears 82 are coaxially aligned with an aperture extending laterally through the chain stay pivot mount 83. Thereafter, a fastener 84 is extended through the coaxially aligned apertures, thus pivotally connecting the end housing 80, and hence the chain stay members 78, to the chain stay pivot mount 83. Rigidly attached to the back ends of the chain stay members 78 via a welding or brazing process is a pair of identically configured clevis members 86, each of which include a pair of juxtaposed end portions 88 having a pair of coaxially aligned apertures extending laterally therethrough.

In the preferred embodiment, the rear wheel axle receiving members 68 attached to the lower ends of the seat stay members 62 are pivotally connected to the clevis members 86 attached to the back ends of the chain stay members 78. In particular, the frontal portion of each rear wheel axle receiving member 68 is inserted into the space defined between the end portions 88 of a respective clevis member 86. In this respect, the end portions 88 of each clevis member 86 are separated from each other a distance sufficient to allow the frontal portion of the rear wheel axle receiving member 68 to be slidably inserted therebetween. The frontal portion of the rear wheel axle receiving member 68 is oriented within the clevis member 86 such that an aperture disposed therein is coaxially aligned with the pair of apertures extending laterally through the end portions 88 of the clevis member 86. Thereafter, fasteners such as pivot pins 90 are extended through the coaxially aligned apertures of the end portions 88 and rear wheel axle receiving members 68, thus pivotally connecting the rear wheel axle receiving members 68 to the clevis members 86, and hence the chain stay members 78.

Referring now to FIGS. 2-4, one of the primary components of the bicycle frame 12 is a shock absorber 92. In the preferred embodiment, the shock absorber 92 comprises a tubular body portion 94 having a reciprocally movable piston rod 96 extending axially from its bottom end, and an upper coupling section 98 attached to its top end. As best seen in FIG. 4, the outer surface of the body portion 94 is threaded so as to allow an upper spring retention member 100 to be threadably received onto the body portion 94. Rigidly attached to the distal end of the piston rod 96 is a lower spring retention member 102 which includes a lower coupling section 104 formed on the outer surface thereof.

The shock absorber 92 further comprises a helical spring member 106 disposed between the upper and lower spring retention members 100, 102 in a manner wherein the upper end of the spring member 106 abuts the inner surface of the upper spring retention member 100, the lower end of the spring member 106 abuts the inner surface of the lower spring retention member 102, and the piston rod 96 of the shock absorber 92 extends axially through the center of the spring member 106. As will be recognized, the tension of the spring member 106, and thus the force needed to reciprocate the piston rod 96, is adjustable via the selective placement of the upper spring retention member 100 on the threaded outer surface of the body portion 94. Additionally, the shock absorber 92, and in particular the body portion 94 thereof, is preferably fluid-filled, with a suitable fluid being infused thereinto via an inlet-outlet valve 108 fluidly coupled to the upper coupling section 98. An elastomer bushing 99 of sufficient resiliency is disposed about the piston rod 96 and attached to the inner surface of the lower spring retention member 102 to serve as a bump-stop for preventing metal-to-metal contact in the event the shock absorber 92 "bottoms-out".

As best seen in FIG. 2, the upper coupling section 98 of the shock absorber 92 is pivotally connected to the upper link 52. In this respect, the upper coupling section 98 is sized so as to be slidably receivable into the space defined between the central pair of mounting ears 58 of the upper link 52. When the upper coupling section 98 is properly oriented between the mounting ears 58, the pair of apertures disposed within the mounting ears 58 are coaxially aligned with an aperture 110 extending laterally through the upper coupling section 98. Thereafter, a fastener such as a pivot pin 112 is extended through the coaxially aligned mounting ear apertures and aperture 110, thus pivotally connecting the shock absorber 92 to the upper link 52. In addition to the pivotal connection of the upper coupling section 98 to the upper link 52, the lower coupling section 104, and hence the piston rod 96, is pivotally connected to the seat stay members 62. In particular, the lower coupling section 104 is positioned within the space defined between the shock mounts 76 rigidly attached to the seat stay members 92, and oriented such that the pair of apertures extending laterally through the shock mounts 76 are coaxially aligned with an aperture 114 extending laterally through the lower coupling section 104. Thereafter, a fastener such as a pivot pin 116 is extended through the coaxially aligned shock mount apertures and aperture 114, thus pivotally connecting the piston rod 96 to the seat stay members 62. Though not shown, it will be recognized that the shock absorber 92 may be mounted between the upper link 52 and seat stay members 62 in a reverse orientation, with the lower coupling section 104 being positioned between and pivotally connected to the mounting ears 58 and the upper coupling section 98 being positioned between and pivotally connected to the shock mounts 76.

In the present invention, the bicycle frame 12 constructed in the previously described manner essentially comprises a four bar linkage system. In this respect, the main front triangle portion of the bicycle frame 12 comprising the head tube 14, seat tube 16, top tube 36, axle receiving bracket 38 and down tube 48 defines the first link of the system (i.e. the ground link of the four bar linkage system), while the chain stay members 78 define the second link of the system. The seat stay members 62 define the third link of the system, while the upper link 52 defines the fourth and final link of the four bar linkage system. As such, the shock absorber 92 "floats" since it is pivotally mounted to and extends between the third and fourth links of the linkage system, i.e. the seat stay members 62 and upper link 52, and is not rigidly mounted to the first link or ground link of the linkage system, i.e. the main front triangle portion of the bicycle frame 12.

As previously discussed, in the majority of prior art bicycle rear suspension linkage systems, the shock absorber is mounted directly to the main front triangle portion of the bicycle frame, thus causing a shock force applied to the rear wheel of the bicycle to be transmitted directly to the main front triangle portion as a bending moment or torque. The transmission of bending moments or torque to the main front triangle portion results in a less smooth ride over bumps or uneven terrain. In the present bicycle frame 12, the isolation of the shock absorber 92 from the main front triangle portion of the bicycle frame 12 and the pivotal connection of the upper link 52 and chain stay members 78 to the main front triangle portion eliminates the direct transmission of bending moments or torque to the main front triangle portion when the rear wheel 72 encounters bumps or other obstructions, thus enhancing the smoothness of the ride and the overall performance of the bicycle 10.

As also previously specified, in most prior art rear suspension linkage systems, the rear axle of the rear wheel pivots about a single elevated pivot point which typically causes the rear wheel axle to move arcuately rather than vertically in a substantially linear fashion. If the rear wheel axle moves in an arc, efficiency is lost due to suspension oscillations caused by changes in the bicycle wheelbase. Importantly, the various components comprising the bicycle frame 12 of the present invention are adapted to provide a suspension for the rear wheel 72 of the bicycle 10 which allows the rear wheel axle 70 to move vertically in a substantially linear fashion when the rear wheel 72 encounters a bump or other obstruction. Additionally, the four bar linkage system defined by the bicycle frame 12 causes the rear wheel axle 70 to be pivoted relative an instantaneous center of zero velocity or rotation, the location of which is optimized to balance the weight transfer (due to forward acceleration), with the chain force pulling the rear wheel axle 70 in a downward direction. When the weight transfer forces are balanced, the bicycle frame 12 is not influenced by pedaling forces.

Referring now to FIGS. 5 and 6, when a shock force is applied to the rear wheel 72 of the bicycle 10, the rear wheel axle receiving members 68 are moved upwardly in the direction A, which results in the planar motion of the seat stay members 62 upwardly generally in the direction B. The upward planar motion of the seat stay members 62 in turn causes the upper link 52 to pivot upwardly about the center point of the fastener 60 in the direction C. Importantly, the upward pivotal motion of the upper link 52 in the direction C concurrently with the planar motion of the seat stay members 62 in the direction B facilitates the compression of the helical spring member 106 between the upper and lower spring retention members 100, 102. The movement of the rear wheel axle receiving members 68 in the direction A also causes the chain stay members 78 to pivot upwardly about the center point of the fastener 84 in the direction D. Advantageously, due to the structure of the rear suspension linkage system, the concurrent upward pivoting of the upper link 52 in the direction C, the planar motion of the seat stay members 62 in the direction B, and the upward pivotal movement of the chain stay members 78 in the direction D causes the rear wheel axle receiving members 68 and hence the rear wheel axle 70 to move generally vertically upwardly in the direction A when the rear wheel 72 is subjected to a shock force.

Due to the placement of the shock absorber 92 between the upper link 52 and seat stay members 62, the upward pivotal movement of the upper link 52, seat stay members 62, rear wheel axle receiving members 68 and chain stay members 78 is controlled and limited thereby. In this respect, the shock absorber 92 is adapted to absorb some of the shock force exerted on the rear wheel 72 as such force is transmitted through the linkage assembly. As will be recognized, the amount of the shock force absorbed by the shock absorber 92 may be selectively adjusted via the positioning of the upper spring retention member 100 along the threaded outer surface of the body portion 94. In particular, the positioning of the upper spring retention member 100 allows the spring preload to be adjusted, thus allowing for adjustments to static ride height, different rider weights and varying riding conditions.

As previously specified, the mounting of the shock absorber 92 solely to the third and fourth links of the linkage system, i.e. to the upper link 52 and seat stay members 62, also eliminates the transmission of the shock force as bending moments to the main front triangle portion of the bicycle frame 12, thus enhancing the overall performance characteristics of the bicycle 10. In addition to the foregoing, this particular placement of the shock absorber 92 serves to reinforce the primary in-line pivot of the four bar linkage system, i.e. the pivot point defined by the attachment of the seat stay end housing 64 to the upper link 52 via the fastener 66. Since, in most prior art rear suspension linkage systems, the primary pivot point of the linkage system is not reinforced by the shock absorber, the linkage system is more susceptible to mechanical failure.

Due to the structure of the bicycle frame 12, the ratio of movement, i.e. the motion ratio, between the rear wheel axle 70 in the direction A and the helical spring member 106 as it is being compressed is constant throughout the range of travel of the rear wheel axle 70, thus providing a relatively flat wheel rate when the rear wheel 72 encounters a shock or other obstruction. As previously discussed, this flat wheel rate is more desirable than a regressive or progressive wheel rate wherein the shock travel and rear wheel axle travel are disproportionate.

Referring now to FIGS. 7-9, illustrated is a rear suspension linkage system constructed in accordance with a second embodiment of the present invention. The bicycle frame 200 incorporating the modified linkage system is substantially identical to the bicycle frame 12 previously described in relation to the first embodiment of the present invention. However, as an alternative to the link mount 50, rigidly attached to the back of the seat tube 16 is a link bracket 202 which defines a pair of triangularly configured flange portions 204 extending in opposed, spaced relation. Extending laterally through the flange portions 204 is a pair of coaxially aligned apertures. The link bracket 202 is preferably attached to the seat tube 16 via a welding or bracing process.

As an alternative to the previously described upper link 52, pivotally connected to the link bracket 202 is an upper link 206. In the second embodiment, the upper link 206 has a generally H-shaped configuration which defines a front pair of mounting ears 208, a back pair of mounting ears 210, and a generally planar central base portion 212. Extending laterally through each pair of mounting ears 208, 210 is a pair of coaxially aligned apertures. The upper link 206 is pivotally connected to the link bracket 202 by initially inserting the front pair of mounting ears 208 between the flange portions 204 of the link bracket 202. In this respect, the distance separating the flange portions 204 from each other is adapted to slidably accommodate the front pair of mounting ears 208 of the upper link 206. When the front pair of mounting ears 208 are properly positioned between the flange portions 204, the apertures disposed therewithin will be coaxially aligned with the pair of apertures disposed within the flange portions 204. Thereafter, a fastener 214 is inserted into the coaxially aligned apertures thus pivotally connecting the upper link 206 to the link bracket 202.

In the modified linkage system, the upper ends of the seat stay members 62 are rigidly attached to a seat stay end bracket 216 rather than the end housing 64 previously described in relation to the first embodiment. The attachment of the seat stay member 62 to the end bracket 216 is preferably facilitated via a welding or brazing process. The end bracket 216 defines an opposed pair of mounting portions 218 having a coaxially aligned pair of apertures extending laterally therethrough. The end bracket 216, and hence the seat stay members 64, are pivotally connected to the upper link 206. The pivotal connection is facilitated by the insertion of the back pair of mounting ears 210 between the mounting portions 218 of the end bracket 216. In this respect, the distance separating the mounting portions 218 from each other is adapted to slidably accommodate the back mounting ears 210 of the upper link 206. When the back pair of mounting ears 210 are properly positioned between the mounting portions 218, the apertures disposed within the mounting portions 218 will be coaxially aligned with the apertures disposed within the front pair of mounting ears 208. Thereafter, a fastener 220 is inserted into the coaxially aligned apertures, thus pivotally connecting the end bracket 216 to the upper link 206.

Though not shown, in the linkage system constructed in accordance with the second embodiment, the rear wheel axle receiving members 68 are attached to the lower ends of the seat stay members 62, and are pivotally connected to the clevis members 86 attached to the back ends of the chain stay members 78 in the same manner previously described in relation to the first embodiment. Additionally, the front ends of the chain stay members 78 of the modified linkage system are rigidly attached to the chain stay end housing 80 which is in turn pivotally connected to the chain stay pivot mount 83 secured within the seat tube 16 as also previously described.

When the end bracket 216 is pivotally connected to the upper link 206, the arcuately contoured upper portions of the seat stay members 62 will be bowed inwardly toward the seat tube 16. As an alternative to the previously described shock mounts 76, rigidly attached to and extending between the arcuately contoured portions of the seat stay members 62 is a shock support 222 which is also directed inwardly toward the seat tube 16. As best seen in FIG. 7, the shock support 222 defines a pair of triangularly configured leg portions 224 which are rigidly attached to respective ones of the seat stay members 62 via a welding or brazing process, and a generally planar middle portion 226 extending between the leg portions 224.

As an alternative to the shock absorber 92 previously described, incorporated into the linkage system constructed in accordance with the second embodiment is a shock absorber 228. The shock absorber 228 comprises an upper retaining plate 230 which is rigidly attached to the upper link 26, and in particular to the lower surface of the base portion 212 thereof. The upper retaining plate 230 defines a generally circular central portion and a peripheral flange portion extending angularly outward from the central portion, thus giving the upper retaining plate 230 a pan-like configuration. The attachment of the upper retaining plate 230 to the upper link 206 is facilitated by the extension of a fastener 232 such as a screw through an aperture disposed in the base portion 212 and into a complimentary internally threaded recess defined within the central portion of the upper retaining plate 230. As will be recognized, the upper retaining plate 230 is initially oriented upon the lower surface of the base portion 212 such that its flange portion extends outwardly therefrom and its internally threaded recess is coaxially aligned with the aperture disposed therewithin.

The shock absorber 228 further comprises a lower retaining plate 234 which is configured identically to the upper retaining plate 230 and rigidly attached to the shock support 222, and in particular, the upper surface of the middle portion 226 thereof. The attachment of the lower retaining plate 234 to the shock support 222 is facilitated by the extension of a fastener 236 such as a screw through an aperture disposed within the middle portion 226 and into the complimentary internally threaded recess defined within the central portion of the lower retaining plate 234. As will be recognized, the lower retaining plate 234 is initially oriented upon the upper surface of the middle portion 226 such that its flange portion extends outwardly therefrom and its internally threaded recess is coaxially aligned with the aperture disposed therewithin.

In addition to the upper and lower retaining plates 230, 234, the shock absorber 228 further comprises an elongate, cylindrically configured dampening or springing member 238 which is preferably fabricated from in elastomeric material and is firmly seated between the upper and lower retaining plates 230, 234. As seen in FIGS. 8 and 9, the springing member 238 preferably defines a central aperture 230 extending axially therethrough. Extending through the central aperture 240 is an elongate limiting cable 242, one end of which is attached to an eyelet 244 formed on the distal end of the recessed portion of the upper retaining plate 230, and the other end of which is attached to an eyelet 246 formed on the distal end of the recessed portion of the lower retaining plate 234.

In the second embodiment, the springing member 238 is preferably compressed between the upper and lower retaining plates 230, 234 to provide a preload thereto. Such compression is typically achieved by sizing the springing member 238 such that when the upper and lower retaining plates 230, 234 are positioned on the opposed ends thereof, the distance separating the outer surfaces of the central portions of the upper and lower retaining plates 230, 234 slightly exceeds the distance separating the lower surface of the base portion 212 from the upper surface of the middle portion 226. As will be recognized, such relative sizing necessitates that the springing member 238 be slightly compressed to enable the upper and lower retaining plates 230, 234 to be inserted and properly oriented between the base portion 212 and middle portion 226. However, the springing member 238 need not be compressed between the upper and lower retaining plates 230, 234, and may alternatively be mechanically fastened thereto.

As seen in FIG. 8, when the modified linkage system is in its normal, uncompressed state, the opposed ends of the springing member 238 are in contact with only the central portions of the upper and lower retaining plates 230, 234, with gaps existing between the outer surface of the springing member 238 and the flange portions of the upper and lower retaining plates 230, 234. When a shock force is applied to the rear wheel 72 of the bicycle incorporating the modified linkage system, the rear wheel axle receiving members 68 are moved upwardly, which results in the upward planar motion of the seat stay members 62. The upward planar motion of the seat stay members 62 in turn causes the upper link 206 to pivot upwardly about the center point of the fastener 214. The upward pivotal motion of the upper link 206 concurrently with the planar motion of the seat stay members 62 facilitates the compression of the springing member 238 between the upper and lower retaining plates 230, 234, as seen in FIG. 9. In this respect, when the shock absorber 228 compresses, the "knee action" of the upper link 206 and seat stay members 62 compresses the springing member 238, with the upper and lower retaining plates 230, 234 moving about a common pivot in a scissor-like motion.

Due to the resilience of the springing member 238, the upper and lower retaining plates 230, 234 may be rigidly, rather than pivotally, attached to the upper link 206 and shock support 222 since the opposed ends of the springing member 238 will conform to the motion of the upper and lower retaining plates 230, 234. When the springing member 238 is compressed, the same is maintained between the upper and lower retaining plates 230, 234 by the flange portions thereof against which the end portions of the springing member 238 are abutted when the same is compressed. Also aiding in maintaining the springing member 238 between the upper and lower retaining plates 230, 234 is the receipt of the internally threaded recessed portions and eyelets of the upper and lower retaining plates 230, 234 into the opposed ends of the central aperture 240. Advantageously, the limiting cable 242 prevents the shock absorber 228, and in particular the springing member 238, from extending beyond its limit.

The linkage system constructed in accordance with the second embodiment of the present invention provides the same performance advantages as previously described in relation to the first embodiment. The modified linkage system provides the additional advantages of facilitating reduced complexity in the construction of the bicycle, as well as reducing maintenance on the shock absorber. In this respect, the modified linkage system includes fewer parts and thus reduces the cost of the bicycle, in addition to making the assembly thereof easier and less costly. Further, the reduction in the number of parts lowers the weight of the bicycle which enhances its performance characteristics.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A bicycle rear suspension linkage system, comprising:
   a bicycle frame;
   an upper link pivotally connected to said bicycle frame;
   a pair of seat stay members having upper ends pivotally connected to said upper link and lower ends;
   a pair of chain stay members having front ends pivotally connected to said bicycle frame and back ends pivotally connected to the lower ends of said seat stay members; and
   a shock absorber having a first end rigidly attached to said seat stay members and a second and rigidly attached to said upper link.

2. The linkage system of claim 1 wherein said bicycle frame comprises:
   a head tube disposed at the front of the bicycle frame;
   a seat tube disposed at the rear of the bicycle frame; and
   an elongate top tube having opposed ends rigidly attached to said head tube and said seat tube.

3. The linkage system of claim 2 wherein said upper link is pivotally connected to said seat tube.

4. The linkage system of claim 2 wherein said bicycle frame further comprises a link bracket rigidly attached to said seat tube, said upper link being pivotally connected to said link bracket.

5. The linkage system of claim 1 further comprising a shock support attached to and extending between said seat stay members, the first end of said shock absorber being rigidly attached to said shock support.

6. A bicycle rear suspension linkage system, comprising:
   a bicycle frame;
   an upper link pivotally connected to said bicycle frame;
   a pair of seat stay members having upper ends pivotally connected to said upper link and lower ends;
   a pair of chain stay members having fronts pivotally connected to said bicycle frame and back ends pivotally connected to the lower ends of said seat stay members; and
   a shock absorber comprising an upper retaining plate rigidly attached to said upper link, a lower retaining plate rigidly attached to said seat stay members, and a springing member firmly seated between said upper and lower retaining plates.

7. The linkage system of claim 6 wherein said springing member is fabricated from an elastomeric material.

8. The linkage system of claim 6 wherein said springing member defines a central aperture extending longitudinally therethrough and said shock absorber further comprises a limiting cable extending through said central aperture and defining opposed ends attached to said upper and lower retaining plates.

9. The linkage system of claim 6 wherein said springing member is compressed between said upper and lower retaining plates to provide a preload thereto.

10. The linkage system of claim 6 wherein said springing member is mechanically fastened to said upper and lower retaining plates.

11. A bicycle rear suspension linkage system, comprising:
    a bicycle frame;
    an upper link pivotally connected to said bicycle frame;
    a pair of seat stay members having upper ends rigidly attached to a seat stay end bracket and lower ends, said seat stay end bracket being pivotally connected to said upper link;
    a pair of chain stay members having front ends pivotally connected to said bicycle frame and back ends pivotally connected to the lower ends of said seat stay members; and
    a shock absorber having a first end connected to said seat stay members and a second end connected to said upper link.

12. A bicycle rear suspension linkage system, comprising:
    a bicycle frame;
    an upper link pivotally connected to said bicycle frame;
    a pair of seat stay members having upper ends pivotally connected to said upper link and lower ends;
    a pair of chain stay members having front ends pivotally connected to said bicycle frame and back ends pivotally connected to the lower ends of said seat stay members; and
    a shock absorber having a first end rigidly attached to said seat stay members and a second end connected to said upper link.

13. A bicycle rear suspension linkage system, comprising:
    a bicycle frame;
    an upper link pivotally connected to said bicycle frame;
    a pair of seat stay members having upper ends pivotally connected to said upper link and lower ends;
    a pair of chain stay members having front ends pivotally connected to said bicycle frame and back ends pivotally connected to the lower ends of said seat stay members; and
    a shock absorber having a first end connected to said seat stay members and a second end rigidly attached to said upper link.

14. A bicycle rear suspension linkage system, comprising:
    a bicycle frame;
    an upper link having front and back ends and a central portion, the front end of said upper link being pivotally connected to said bicycle frame;
    a pair of seat stay members having upper ends pivotally connected to the back end of said upper link and lower ends;
    a pair of chain stay members having front ends pivotally connected to said bicycle frame and back ends pivotally connected to the lower ends of said seat stay members; and
    a shock absorber having a first end pivotally connected to said seat stay members and a second end pivotally connected to the central portion of said upper link.

15. A bicycle rear suspension linkage system comprising:
    a bicycle frame;

an upper link having front and back ends and a central portion, the front end of said upper link being pivotally connected to said bicycle frame;

a pair of seat stay members having upper ends pivotally connected to the back end of said upper link and lower ends;

a pair of chain stay members having front ends pivotally connected to said bicycle frame and back ends pivotally connected to the lower ends of said seat stay members; and a shock absorber having a first end connected to seat stay members and a second end connected to the central portion of said upper link.

* * * * *